US012601150B2

(12) United States Patent
Nylander

(10) Patent No.: US 12,601,150 B2
(45) Date of Patent: Apr. 14, 2026

(54) SAFETY SYSTEM FOR MACHINE

(71) Applicant: OilQuick AB, Hudiksvall (SE)

(72) Inventor: Erik Nylander, Hudiksvall (SE)

(73) Assignee: OILQUICK AB, Hudiksvall (SE)

( * ) Notice: Subject to any disclaimer, the term of this patent is extended or adjusted under 35 U.S.C. 154(b) by 6 days.

(21) Appl. No.: 18/242,354

(22) Filed: Sep. 5, 2023

(65) Prior Publication Data

US 2024/0076853 A1 Mar. 7, 2024

(30) Foreign Application Priority Data

Sep. 6, 2022 (EP) .................................... 22194155

(51) Int. Cl.
*E02F 9/22* (2006.01)
*F15B 20/00* (2006.01)

(52) U.S. Cl.
CPC ............ *E02F 9/226* (2013.01); *F15B 20/004* (2013.01); *F15B 2211/30525* (2013.01); *F15B 2211/5151* (2013.01)

(58) Field of Classification Search
CPC . E02F 9/24; E02F 9/226; E02F 3/3627; F15B 20/00
See application file for complete search history.

(56) References Cited

U.S. PATENT DOCUMENTS

2004/0244575 A1 12/2004 Fatemi et al.
2011/0088795 A1 4/2011 Hill et al.
2017/0159263 A1 6/2017 Meier et al.
2018/0202467 A1* 7/2018 Eguchi .................. F15B 11/028

FOREIGN PATENT DOCUMENTS

JP 6-57952 U 8/1994
WO WO 2011/019312 A1 2/2011
WO WO 2014/058380 A1 4/2014
WO WO 2015/102120 A1 7/2015

OTHER PUBLICATIONS

European Search Report, issued in EP Application No. 22194155.2, dated Feb. 24, 2023.

* cited by examiner

*Primary Examiner* — Nathaniel E Wiehe
*Assistant Examiner* — Daniel S Collins
(74) *Attorney, Agent, or Firm* — Birch, Stewart, Kolasch & Birch, LLP

(57) ABSTRACT

A safety system for a machine includes a pressurizing device; at least one hydraulic cylinder, the at least one hydraulic cylinder including a pressure chamber and a piston having a head and a rod, the piston being movable within the pressure chamber along a longitudinal direction; a first pressure sensor and a second pressure sensor being designed to measure the pressure within the pressure chamber via a first channel having a first opening and a second channel having a second opening, which both extend into the pressure chamber, and are spaced apart as seen in the longitudinal direction; a seal device arranged circumferentially around the head of the piston, and a hydraulic system being fluidically connected to a head side and a rod side of the at least one hydraulic cylinder, the hydraulic system being fluidically connected to a hydraulic fluid reservoir and the pressurizing device.

15 Claims, 5 Drawing Sheets

SAFETY SYSTEM FOR MACHINE

TECHNICAL FIELD

The invention relates to the field of safety systems for machines designed to detect different states of a coupling mechanism when tools are coupled to a tilt rotator or quick coupling or the like, for example for a construction machine, a forest machine or any other industrial vehicle or machine. In another embodiment the invention relates to and may be part of a hydraulic system of a machine or device.

BACKGROUND OF THE INVENTION

Often when heavier machinery is used for applications such as construction, forestry, demolition or unbuilding and so on, various tools need to be connected to such machines for different purposes. In many cases tool holders are used for such applications, whereby tool holders act as intermediate devices that couple to the machine in a more permanent way, for example screwed and bolted, and to various tools in a releasable way for instance using a hydraulic or pneumatic system as described herein. Such tool holders are typically designed to be used with the hydraulic system and/or the electric system of the machine and in many cases these tools connect the hydraulic system and/or the electric system of the machine to the hydraulic components and/or electronic components of the tool. Since these tool holders also and in particular provide a mechanical coupling between the machine and the tool, safety is always a concern in particular the safety of the mechanical coupling, especially since these mechanical couplings usually are performed automatically from the cabin of the machine by the operator. This means that even though the operator can, at least from a distance/cabin, visually check the connection between the tool holder there is always a risk that the mechanical connection is not established in a safe manner. The mechanical connection of such tool holders is typically established by using a hydraulic system having a coupling mechanism, whereby the coupling mechanism is coupled to at least one hydraulic cylinder. In many cases the locking mechanism further comprises a hook shaped element and the hydraulic cylinder is connected to an arm. The tool typically comprises two brackets, for example in the form of rods, arranged at a distance to one another so that the hook shaped element of the locking mechanism can engage one bracket and the arm the other bracket by extending upon movement of the hydraulic cylinder. During the extension movement of the arm errors can occur, which errors can lead to unsafe connections between tool and tool holder and therewith may risk injury of personnel or damage of equipment. Attempts have been made to survey the mechanical couplings between tool holder and tools as disclosed in WO 2014/058380 A1 and WO 2011/019312 A1.

WO 2014/058380 A1 is built up as described above, whereby the tool holder comprises a hook shaped element or cut-out and an arm or locking plate that can be moved by a hydraulic cylinder (c.f. FIG. 5) whereby a rod is connected to the cylinder. The rod comprises a metal ring that triggers an inductive sensor when the hydraulic cylinder and the locking element are in a closed position as shown in FIG. 5. In order to detect that the second fastening pin is correctly engaged another inductive sensor is present that detects if the second fastening pin is snug embedded in a receiving portion. The solution disclosed in WO 2014/058380 A1 requires a special setup with the rod comprising the metal ring, whereby the rod is also connected to the hydraulic cylinder. In addition, the situation where the cylinder is fully extended and fully retracted cannot be detected, in both positions none of the sensors will indicate contact.

WO 2011/019312 A1 discloses another safety system for such a tool holder, which aims to determine a position of a piston of the hydraulic cylinder by measuring the amount of hydraulic fluid that is moved. The amount of hydraulic fluid moved is directly proportional to the stroke length of the piston. In order to measure the displaced hydraulic fluid a hydraulic supply line is provided with a restriction and a pressure sensor on either side of the restriction. Based on Bernoulli's equation the flow through the restriction can be determined and therewith the volume of the displaced hydraulic fluid and finally the stroke length. This restriction comes with certain challenges, one being that it increases the hydraulic pressure in the system and therewith the hydraulic system requires more energy.

A system for observing stroke length in hydraulic cylinders via pressure sensors is further shown in US 2004/0244575 A1, however the pressure cannot be detected on either side of the piston since the sensors are arranged in the hydraulic system and not directly at the hydraulic cylinder with channels into the pressure chamber. This also means that the seal in US 2004/0244575 A1 does not move over the openings of the channels that are connected to pressure sensors. In addition, the US 2004/0244575 A1 does not allow to detect four different states of the safety system but only two different states.

In light of the above the present invention seeks to provide an improved safety system for a machine.

SUMMARY OF THE INVENTION

An object of the present invention is to provide a safety system for a machine that is robust, versatile, accurate and reliable.

In view of the above-mentioned challenges the inventors of the present invention have discovered that it is possible to detect different states of a hydraulic cylinder versus a coupling mechanism in a tool holder or the like by using at least one pressure sensor that is measuring the pressure in a pressure chamber of the hydraulic cylinder via a first channel into the pressure chamber. The inventors have discovered that this is possible, if a seal device is used that can withstand high pressures and that can move over or across openings that lead into the pressure chamber of the hydraulic cylinder. The seal device moves over the opening of the channel when the piston of the hydraulic cylinder is moved for locking and unlocking a tool or the like on the tool holder. For the described purpose, the inventors have discovered that it is possible to either use a second pressure sensor also directly coupled to the pressure chamber via a channel, whereby a first channel of the first pressure sensor and a second channel of the second pressure sensor and in particular openings of the first and second channels into the pressure chamber of the hydraulic cylinder are spaced apart as seen in a longitudinal direction of the hydraulic cylinder. Alternatively the inventors have discovered that a bypass channel in combination with the first pressure sensor may be used to detect various states of the coupling mechanism and the piston, respectively. The two openings of the bypass channel into the pressure chamber of the hydraulic cylinder are thereby also spaced apart longitudinally from one another and from the first channel. Finally, the inventors have discovered that it is possible to detected various states of the coupling mechanism in combination with a reader on a reversing valve arranged in a hydraulic system, in particular four states namely piston in locked position state, piston activated but blocked state, piston in fully retracted state and piston in fully extended state. As an alternative to the reader, the inventors have further discovered that a third pressure sensor arranged close to or at the hydraulic supply line of the a head side of the pressure chamber can be used to differentiate a piston fully extended state and a piston fully retracted state.

Disclosed herein is a safety system or tool holder for a machine comprising:

- a pressurizing device;
- at least one hydraulic cylinder being coupled to a locking mechanism said at least one hydraulic cylinder comprising a pressure chamber and a piston having a head and a rod, the piston being movable along a longitudinal direction of the hydraulic cylinder;
- a first pressure sensor and a second pressure sensor, the first and second pressure sensors being designed to measure the pressure within the pressure chamber via a first channel and a second channel, which both extend into the pressure chamber, said first channel and second channel and their respective openings into the pressure chamber being spaced apart as seen in the longitudinal direction of the at least one hydraulic cylinder;
- a seal device arranged circumferentially around the head of the piston; and
- a hydraulic system being fluidically connected to a head side and a rod side of the at least one hydraulic cylinder, the hydraulic system further being fluidically connected to a hydraulic fluid reservoir and the pressurizing device.

The seal device is designed to move a plurality of times over openings of the first and second channels and wherein at least one different states of the safety system can be detected via the first and second pressure sensors, namely piston in locked position state.

Using this solution, no additional or extra system is required for determining a position of the coupling mechanism of a tool holder. Also, no restriction in the hydraulic system is needed to detect positions of a cylinder via volume of displaced hydraulic fluid, which means that a more efficient system is used and employed. Using the safety system directly on the hydraulic system as it is, further increases simplicity and therewith reliability of the safety system.

In an embodiment the first pressure sensor senses a pressure P1 and the second pressure sensor senses a pressure P2 and wherein a piston in locked position state is detected when: $P1<P2$.

During connection of a tool to the tool holder this may help an operator or electronic system of the machine to detect when a tool is successfully and safely coupled to the tool holder.

In a further embodiment the hydraulic fluid reservoir has a reservoir pressure $P_{res}$, which is lower than pressure generated by the pressurizing device, wherein the piston activated but blocked state is detected when: $P1=P2=P_{res}$.

This is one of the dangerous use cases, which needs to be detected. The operator may not spot this state and assume that the tool is correctly locked to the tool holder.

The detection of the above states is increasing safety of the tool holder and therewith the entire application. The differentiation and detection of further states are described referring to the figures.

The invention is now described in more detail referring to the figures.

BRIEF DESCRIPTION OF THE DRAWINGS

The present invention will now be described, for exemplary purposes, in more detail by way of an embodiment(s) and with reference to the enclosed drawings, in which.

DETAILED DESCRIPTION

Figure 1:
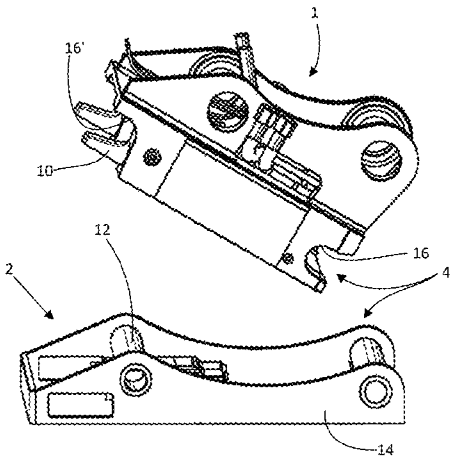
FIG. 1 schematically illustrates a coupling arrangement between a tool holder and a tool adapter or tool.
Figure 2:
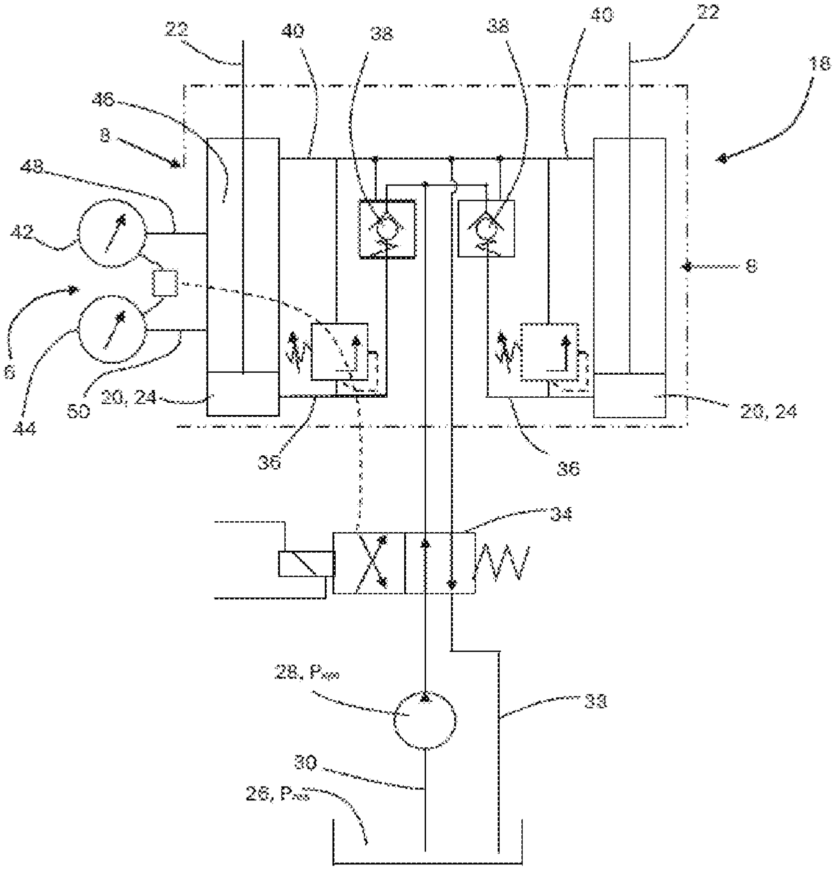
FIG. 2 schematically illustrates a hydraulic plan of a first embodiment of a safety system according to the present invention.
Figure 3:
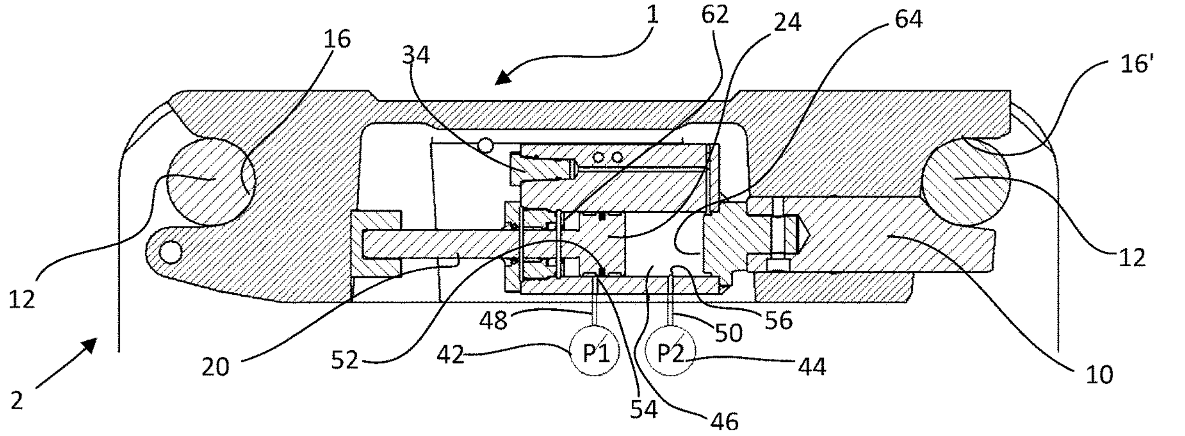
FIG. 3 schematically illustrates the tool holder with the piston in locked stated and the first embodiment of the safety system.

FIG. 1 schematically illustrates a tool holder 1 and a tool 2 that can be connected to one another via a coupling system 4. The tool holder 1 is typically coupled to a machine, for example an excavator or forestry machine or the like. The tool 2 or tool adapter 2 is typically arranged on a tool such as a shovel, forestry tool, cutter, compactor or the like. The tool 2 or tool adapter 2 is designed so that it can be coupled to the tool holder 1 automatically without manual interference of an operator at the actual tool 2 or tool holder 1. The coupling of the tool holder 1 to the tool 2 is established by a coupling mechanism 4 comprising at least one hydraulic or pneumatic cylinder 8 (c.f. FIGS. 2 and 3) connected to lock fingers 10 or lock protrusion and hook shaped cut outs 16 and at least partially hook shaped cut outs 16' on the tool holder 1 and a pair of brackets 12 on the tool 2 or tool adapter 2. In FIG. 1 the lock fingers 10 are shown in an at least partially extended state, thus with the hydraulic cylinder 8 at least partially extended. When the tool adapter 2 is connected to the tool holder 1 then the hook shaped cut outs 16 are engaged first in one of the brackets 12. As soon as the hook shaped cut outs 16 have securely engaged the tool adapter 2 the tool adapter 2 or tool 2 can be lifted and tilted by the machine via the tool holder 1 so that the at least partially hook shaped cut outs 16' can engage the other of the pair of brackets 12, when the lock fingers 10 are retracted and typically with the help of gravity. Once the other of the pair of brackets 12 is engaged in the at least partially hook shaped cut outs 16' the lock fingers 10 can be extended so that they lock both brackets 12 of the pair of brackets 12 securely and the tool can be used by the operator. The coupling does not necessarily need to be established by lifting the tool 2, tilting it on the ground or just smoothly coupling while the tool is laying on the ground may be enough to connect both the pair of brackets 12 to the tool holder 1 via the coupling mechanism 4.

The pressure provided by the pressurizing device 28 is called system pressure $P_{syst}$. The pressure present in the tank 26 or reservoir is called reservoir pressure $P_{res}$. The system pressure $P_{syst}$ is typically higher than the reservoir pressure $P_{res}$ as it is used to power the system and move the cylinders in and out.

During the connection of the tool holder 1 to the tool adapter 2, it is beneficial if the operator can actually see and observe the status of the coupling mechanism 4 so that it can be determined whether or not the tool 2 is securely coupled to the tool holder 1 or if there is a problem. The present invention is directed towards such issues and potential problems concerning the connection of the tool 2 to the tool holder 1. In order to better survey and observe the connection between tool holder 1 and tool 2 embodiments of a safety system for a machine or a tool holder 1 is herewith described referring to FIGS. 2 to 11.

FIG. 2 illustrates, schematically, a hydraulic system 18 for a machine and shows the hydraulic cylinders 8 for the lock fingers 10 according to FIG. 1. It consists of two hydraulic cylinders 8 each having a rod 22 and a head 24 which form the piston or plunger 20. Each rod 20 is connected with a respective lock finger 10 (c.f. FIG. 1). The hydraulic medium supply means comprises a tank 26, a pressurizing device 28, for example in the form of a pump or hydraulic pump, a supply line 30, and a return line 32. A reversing valve 34 connects the pressurizing device 28 with either the supply line 30 or the return line 32. In the shown position of the reversing valve 34, the pressurizing device 28 is connected with the supply line 30. From the supply line 30, the hydraulic fluid, usually oil, is distributed to a respective branch line 36 via a respective non-return valve 38 to each of the pressure sides of the hydraulic cylinders 8. Via a respective branch line 40, the return line 32 is connected with each of the return sides of the hydraulic cylinders 8. The branch lines 36, 40 may also be denoted as first and second hydraulic lines 36, 40.

FIG. 2 further illustrates the safety system 6 comprising a first pressure sensor 42 and a second pressure sensor 44. The first and second pressure sensors 42, 44 are arranged so that they communicate with a pressure chamber 46 of the hydraulic cylinder 8 via a first channel 48 for the first pressure sensor 42 and a second channel 50 for the second pressure sensor 44. The first and second pressure sensors 42, 44 are designed to detect the pressure in the pressure chamber 46 on either side of the head 24 of the piston 20 depending on the position of the piston and the head 24, respectively. By detecting the pressure in the pressure chamber 46 various states of the coupling mechanism 4 can be detected as further explained herein. In order to detect these various states, a first opening 54 (c.f. FIG. 3) of the first channel 48 of the first pressure sensor 42 and the second opening 56 (c.f. FIG. 3) of the second channel 50 of the second pressure sensor 46 need to be spaced apart longitudinally, as seen along the longitudinal axis defined by the hydraulic cylinder 8. The safety system 6 allows to detect several states of the coupling mechanism 4 and these states will now be described referring to FIGS. 3 to 6. It is to be noted that the safety system 6 is illustrated to be arranged on one of the pairs of hydraulic cylinders 8 in FIG. 2. The safety system 6 may however also be installed on both cylinders 8 for redundancy and/or additional safety purposes. Further the coupling mechanism 6 may only comprise one hydraulic cylinder (not shown) or more than two hydraulic cylinders (not shown).

FIG. 2 further illustrates a processor 66 connected to the first pressure sensor 42, the second pressure sensor 44 and the reader of the reversing valve 34 or the reversing valve 34 (dashed line in FIG. 2) and/or the third pressure sensor (not shown in FIG. 2).

Referring to FIG. 3, similar reference numbers are denoting the same or similar components as FIGS. 1 and 2, respectively, a coupling mechanism 4 and a safety system 4 is shown. In figure the coupling mechanism 4 and the piston 20, respectively, is shown in a locked position. As can be seen in FIG. 3, the lock fingers 10 lock and engage one of the brackets 12 of the tool adapter 2 or tool 2 and push it snug into the partial hook-shaped cut out 16' while the other of the brackets 12 is fully engaged in the hook shaped cut out 16 for a secure coupling of the tool 2.

The head 24 comprises a seal device 52 designed to divide the pressure chamber 46 into two compartments and also designed to be able to move over openings 54, 56 of the first and second channels 48, 50 that connect the first and second pressure sensors 42, 44 with the pressure chamber 46. In the state illustrated in FIG. 3, namely the piston 20 in locked state, the piston 20 is extended but not fully extended and the lock fingers 10 engage the bracket 12 while the other bracket 12 is fully engaged in the hook-shaped cut out 16. In the piston in the locked state, the hydraulics push the piston 20 towards a head side 64 of the pressure chamber 46. The head side is the side of the pressure chamber 46 that is closest to the lock fingers 10. The bracket 12 prohibits further movement of the piston 20 by blocking the lock fingers 10 from further extension due to a form fit between lock fingers 10 and bracket 12. In this situation a first pressure P1 sensed at the first pressure sensor 42 is smaller than a second pressure P2 sensed at the second pressure sensor 44.

In order for the pressure sensing to work smoothly it is of importance that the seal is designed to be able to slide over the openings 54, 56 of the first and second channels 48, 50, respectively. The seal device 52 can handle up to 600 bar in pressure and comprises an O-ring and seal ring. The O-ring and the seal ring are thereby embedded in a groove in the head 24 so that the O-ring is arranged at the or close to the bottom of the groove and the seal ring on an outer side of the O-ring. During movement the O-ring can thereby move and provide space to the seal ring when the head 24 is sliding over one of the openings 54, 56. Typically the O-ring is made of a softer material than the seal ring. Any other type of seal device that is suitable to slide a plurality of times over an opening in the hydraulic cylinder when the plunger or piston of the hydraulic cylinder is moving can be employed and used in the invention present herein.

In view of FIG. 3, the piston in locked state can therewith being detected by $P1<P2$. It is to be noted that the reversing valve 34 is connected to a reader for determining a position of the reversing valve whereby the reversing valve can be moved between:

- a first position in which the hydraulic system connects the head side with the pressurizing device 28 and a rod side 62 with the hydraulic fluid reservoir 26 or tank 26, and:

a second position in which the hydraulic system connects the rod side 62 with the pressurizing device 28 and the head side with the hydraulic fluid reservoir 26.

Thus, in the situation according to FIG. 3, the reversing valve 34 is in the first position connecting the head side with the supply line 30 (not shown in FIG. 3) and the pressurizing device 28 (not shown in FIG. 3) for locking the bracket 12 in the hook-shaped cut-out 16. The first pressure P1 will correspond to the tank pressure $P_{res}$ and the second pressure P2 to the system pressure $P_{syst}$. The reversing valve 34 is however not needed to determine the piston 20 in locked state.

Figure 4:
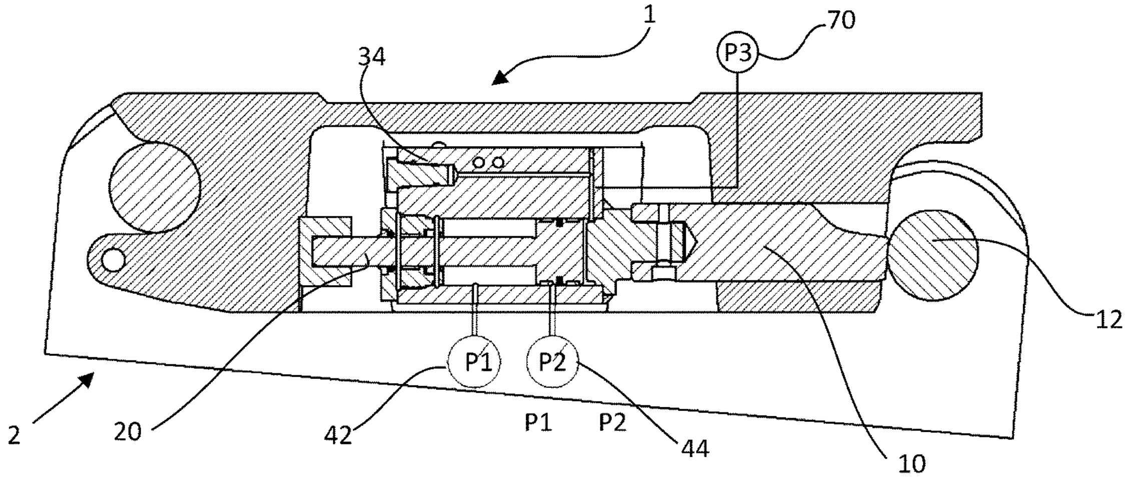
FIG. 4 schematically illustrates the tool holder with the piston in activated but blocked state and the first embodiment of the safety system.
Figure 5:
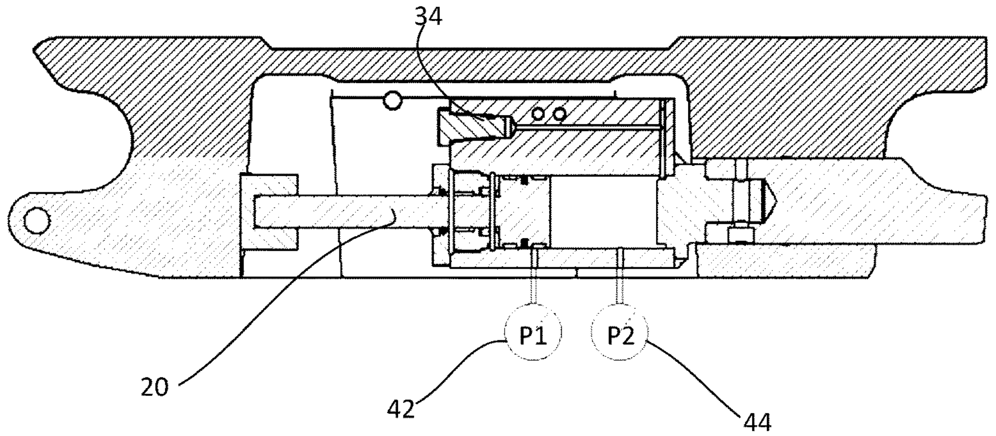
FIG. 5 schematically illustrates the tool holder with the piston in fully extended state and the first embodiment of the safety system.
Figure 6:
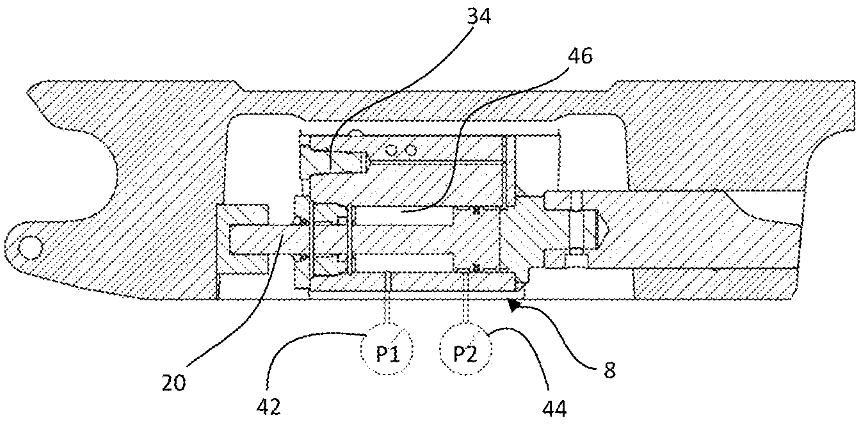
FIG. 6 schematically illustrates a tool holder with a piston in fully retracted state and the first embodiment of the safety system.

Referring to FIGS. 4 to 6 the other states or position of the piston 20 are herewith described. It can however be summarized that the other states basically all refer to an incorrect locking of the brackets 12 in the hook-shaped cut-outs 16 and at least partially hooked shaped cut-outs 16'.

FIG. 4 illustrates the piston 20 in activated but blocked state in which the piston 20 is supposed to extended but the lock fingers 10 are blocked by the bracket 12 so that the first pressure P1 sensed at the first pressure sensor 42 is the same as the second pressure P2 sensed at the second pressure sensor 44 and whereby the first pressure P1 and the second pressure P2 correspond to the reservoir pressure $P_{res}$ (c.f. FIG. 2) provided by the pressurizing device 28. This state, to piston 20 activated but blocked state is dangerous and correspondingly signalled to the operated for example via a display and/or acoustically and/or haptically. Additionally, the reversing valve 34 is in the first position connecting the head side with the pressurizing device 28 and the supply line 30, respectively (c.f. FIG. 2).

FIG. 5 illustrates the piston 20 in fully extended state, whereby the sensed first pressure P1 and the sensed second pressure P2 have the same value and also correspond to the system pressure $P_{syst}$ and the reversing valve 34 is in the first position connecting the head side with the pressurizing device 28 and the supply line 30, respectively.

Finally FIG. 6 illustrates the piston 20 in fully retracted state, whereby the first pressure P1 and the second pressure P2 are the same and correspond to the system pressure $P_{syst}$. The reversing valve 34 is in the second position connecting the rod side 62 with the pressurizing device 28 and the supply line 30, respectively.

Referring back to FIG. 4, alternatively, to the reader at the reversing valve 34, a third pressure sensor 70 for sensing a third pressure P3 may be installed close to the head side or directly at the head side and not within the pressure chamber 46 of the hydraulic cylinder 8. The third pressure sensor 70 may be installed on any of the shown embodiments but is only illustrated in FIG. 3 for simplicity reasons and to illustrate that it is not needed in all embodiments depending on the variant of piston state detection as described herein.

The third pressure 70 sensor may be used to differentiate the piston fully extended state and the piston fully retracted state, whereby the piston fully retracted state is detected when P1 equals P2 and the pressure P3 sensed at the third pressure sensor 70 is smaller than P1 and P2.

The piston fully extended state can be detected when P1 equals P2 and P2 equals P3.

In addition to the above the piston activated but blocked state can also be detected when P1 equals P2 but P3 is greater than P1 and P2.

The piston locked state can be detected when P1 is smaller than P2 and P2 equals P3.

The above examples are based on a certain distancing between the first pressure sensor 42 and the second pressure sensor 44 as illustrated. Depending on the chosen distance between the first opening 54 of the first channel 48 of the first pressure sensor 42 and the second opening 56 of the second channel 50 of the second pressure sensor 44 other conditions for the four different states may apply. The invention is based on the realization that channels and their openings can be used to connect a pressure chamber 46 of a hydraulic (or pneumatic) cylinder 8 to pressure sensors 42, 44 using a seal device 52 at the head 24 of the piston, which seal device 52 is designed to glide over the openings of such channels.

The piston in fully extended state, the piston in fully retracted state and the piston activated but blocked state may be identified as a false and the piston in locked position state may be identified as true by the processor 66. Corresponding visual, haptic and/or acoustic signals may be addressed to the operator of the machine.

Turning now to FIGS. 7 to 11 another embodiment of the present invention is herewith described.

Figure 7:
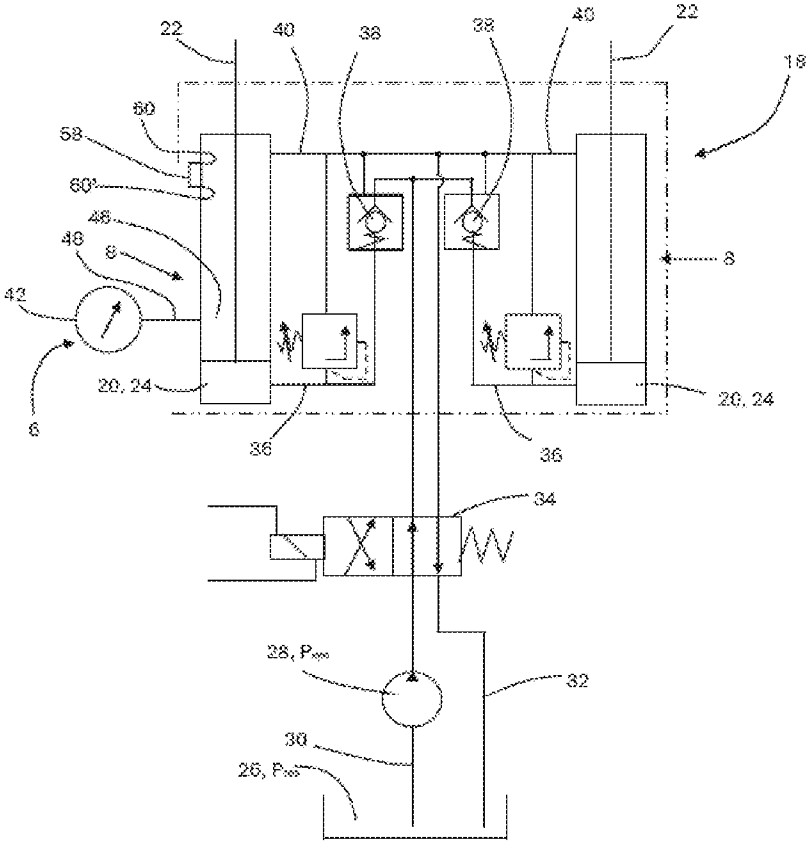
FIG. 7 schematically illustrates another hydraulic plan of a second embodiment of the safety system according to the present invention.

FIG. 7 illustrates a similar hydraulic system 18' as FIG. 2 with similar or same components being denoted with the same reference numbers. The functionality and description and components referring to FIG. 2 apply also for the illustration of FIG. 7 with the difference in the safety system 6'. The difference between the safety system 6' according to FIG. 7 and the safety system 6 according to FIG. 2 is that the safety system 6' illustrated in FIG. 7 comprises a bypass channel 58 instead of the second pressure sensor. The bypass channel 58 or bypass 58 is designed as a U-shaped bridge connection that has two openings 60, 60' into the pressure chamber 46 of the hydraulic cylinder 8. The openings 60, 60' are spaced apart as seen in a longitudinal direction of the hydraulic cylinder 8 so that they can bridge the seal device 52 in a certain position of the piston 20.

The bypass channel can be used to determine the states of the piston 20 as described in relation to FIGS. 8 to 11. Again in order for the bypass channel 58 to function properly a seal device 52 as previously described needs to be installed, which seal device 52 can move across the openings 60, 60' of the bypass channel 58 and the opening of the channel connecting the first pressure sensor 42 with the pressure chamber 46.

Figure 8:
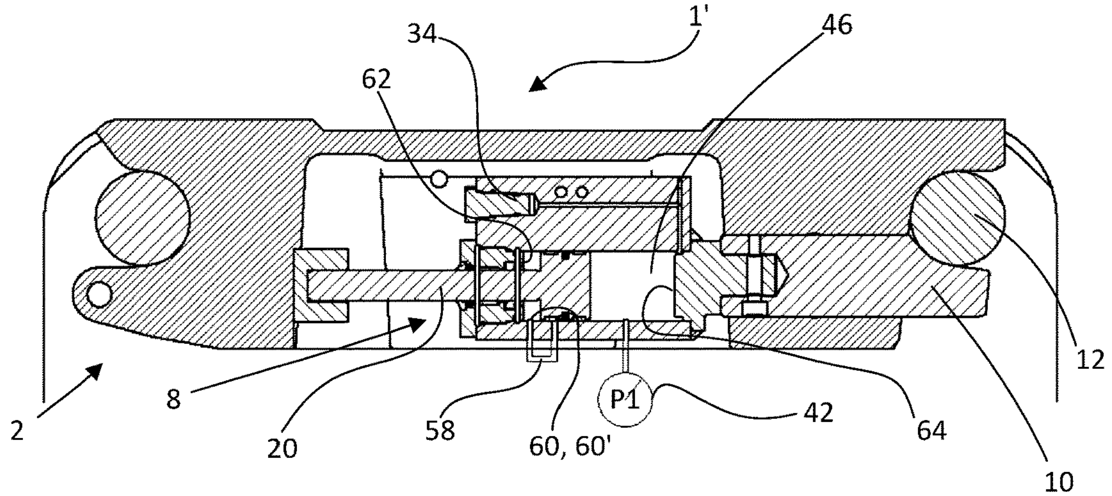
FIG. 8 schematically illustrates the tool holder with the piston in locked state and the second embodiment of the safety system.

FIG. 8 illustrates the tool holder 1' and the tool 2 or tool adapter 2 whereby the piston 20 is in the locked state in which the lock fingers 10 securely engage one of the brackets 12. The bypass 58 channel or bypass 58 is arranged at a distance of the first pressure sensor 42 as seen along the longitudinal direction of the hydraulic cylinder 8. The bypass channel 58 has two openings 60, 60' into the pressure chamber 46 of the hydraulic cylinder 8. The bypass channel 58 is arranged closer to the rod side 62 of the hydraulic cylinder 8 while the first pressure sensor 42 is arranged closer to the head side 64 in the embodiment shown in FIGS. 7 to 11.

Figure 10:
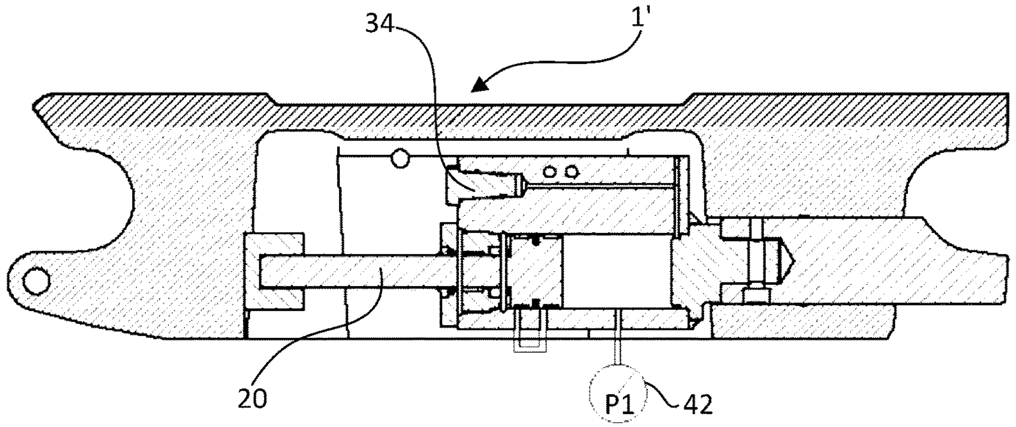
FIG. 10 schematically illustrates the tool holder with the piston in fully extended state and the second embodiment of the safety system, and FIG. 11 schematically illustrates a tool holder with the piston in fully retracted state and the second embodiment of the safety system.

The bypass 58 is arranged so that it bridges the seal device 52 in the piston fully extended state (shown in FIG. 10).

In order to detect the various states of the piston 20 a value for a limited pressure $P1_{limit}$ is defined, whereby $P1_{limit}$ is determined in relation to a diameter of the bypass channel and whereby the system pressure $P_{syst}$ being provided by the pressurizing device 28 is always greater than $P1_{limit}$ and whereby a reservoir pressure $P_{res}$ present in the hydraulic fluid reservoir or tank 26 is always lower than $P1_{limit}$.

In FIG. 8 the piston 20 is in the locked state, which can be detected when the sensed pressure P1 sensed by the first pressure sensor 42 is higher than $P1_{limit}$. In this state the reversing valve 34 is in the first position in which the head side 64 is connected with the pressurizing device 28 and the supply line 30, respectively.

Figure 9:
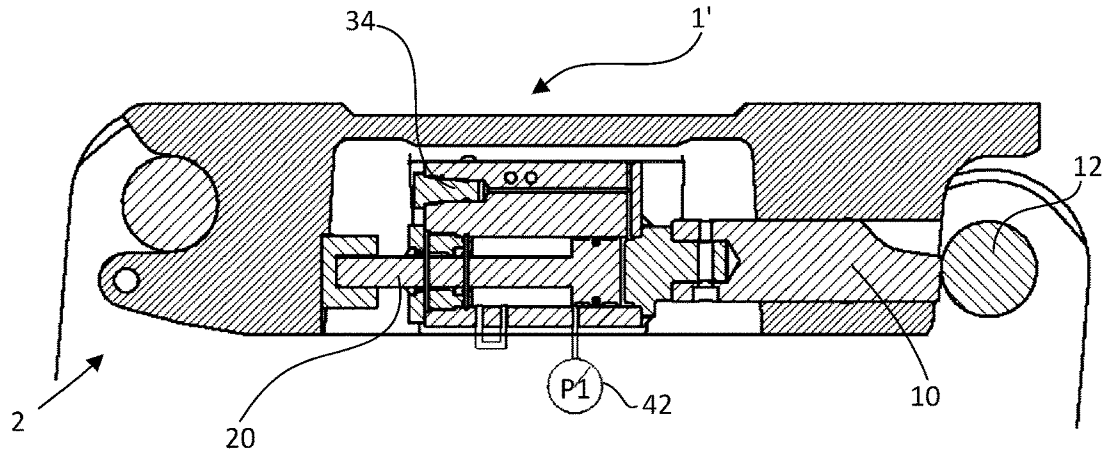
FIG. 9 schematically illustrates the tool holder with the piston in activated but blocked state and the second embodiment of the safety system.

FIG. 9 illustrates the piston 20 in the activated but blocked state, thus when the lock fingers 10 try to extend due to the pressure from the piston 20 and the hydraulic system 18', respectively, but are blocked by the bracket 12. This piston activated but blocked state can be detected when the sensed pressure P1 at the first pressure sensor 42 is lower than $P1_{limit}$ and wherein the sensed pressure P1 is equal to the reservoir pressure $P_{res}$. The reverse valve 34 is thereby in the first position connecting the head side 64 to the supply line 30. Again, the reverse valve 34 position is not needed to detect piston 20 in the activated but blocked position.

FIG. 10 illustrates the piston 20 in the fully extended state, which can be detected when the sensed pressure P1 sensed by the first pressure sensor 42 is lower than $P1_{limit}$ but higher than the reservoir pressure $P_{res}$. In this state thus piston 20 fully extended state the reversing valve 34 is in the first position connecting the head side 34 with the supply line 30. The reversing valve 34 position is not needed to determine the piston 20 fully extended state.

Figure 11:
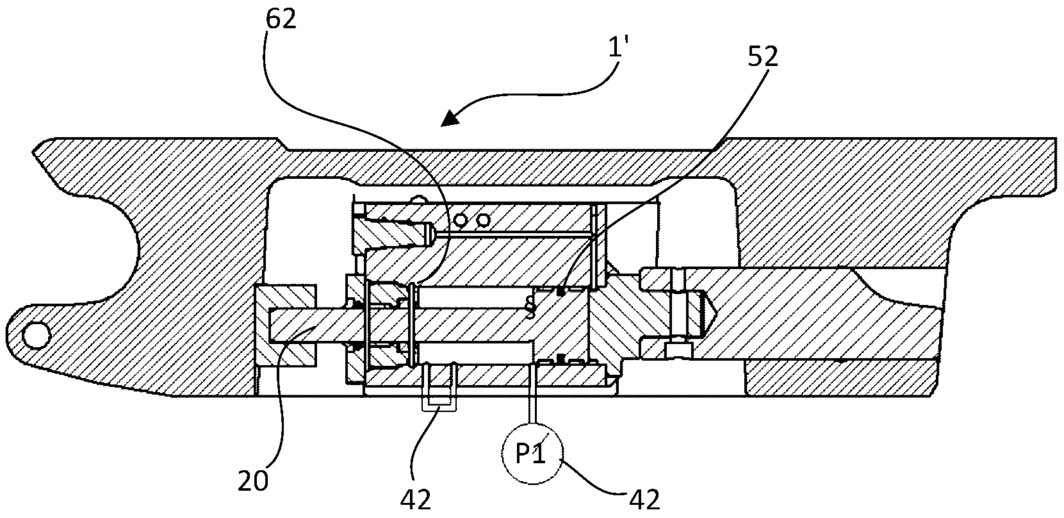

Finally, FIG. 11 shows the piston 20 in fully retracted state, which can be detected when the sensed pressure P1, sensed by the first pressure sensor 42, is higher than $P1_{limit}$ and when the reversing valve 34 is in the second position connecting the rod side 62 with the supply line 30 (not shown).

Further disclosed herein is:

i) In another embodiment according to the invention, a safety system for a machine comprises:
  - a pressurizing device;
  - at least one hydraulic cylinder coupled to a locking mechanism said at least one hydraulic cylinder comprising a pressure chamber and a piston having a head and a rod, the piston being movable along a longitudinal direction of the hydraulic cylinder;
  - a pressure sensor being designed to measure the pressure within the pressure chamber via a channel and an opening into pressure chamber,
  - a seal arranged circumferentially around the head of the piston;
  - a hydraulic system being connected to a head side and a rod side of the at least one hydraulic cylinder, the hydraulic system further being connected to a hydraulic fluid reservoir and a pressurizing device;
  - a bypass channel having two openings into the pressure chamber, the bypass channel and its openings, respectively, being arranged closer to the rod side of the at least one hydraulic cylinder than the channel and its opening, respectively, and wherein the openings of the bypass channel are arranged at a distance of the opening of the channel of the pressure sensor as seen in a longitudinal direction of the hydraulic cylinder, wherein the seal is designed to move a plurality of times over the opening of the channel and the openings of the bypass channel when the at least one hydraulic cylinder is extending and retracting, so that at least three different states of the safety system, for example piston in fully extended state, piston in locked state and piston activated but blocked state, can be detected.

ii) The embodiment according to i), wherein the bypass channel is arranged so that it bridges the seal when the piston is in the piston in fully extended state.

iii) The embodiment according to i) or ii), wherein a value for a limited pressure $P1_{limit}$ is defined, whereby $P1_{limit}$ is determined in relation to a diameter of the bypass channel and whereby a system pressure $P_{syst}$ being provided by the pressurizing device is always greater than $P1_{limit}$ and whereby a reservoir pressure $P_{res}$ present in the hydraulic fluid reservoir is always lower than $P1_{limit}$.

iv) The embodiment according to iii), wherein the piston in fully extended state is detected when the sensed pressure P1 sensed by the first pressure sensor is lower than $P1_{limit}$ but higher than the reservoir pressure $P_{res}$.

v) The embodiment according to any of iii) to v), wherein the piston activated but blocked state is detected when the sensed pressure P1 is lower than $P1_{limit}$ and wherein the sensed pressure P1 is at least more or less equal to the reservoir pressure $P_{res}$.

vi) The embodiment according to any of i) to vi), wherein the hydraulic system further comprises a valve connected to a reader for determining a position of the valve, the valve being able to be set into:
  - a first position in which the hydraulic system connects a head side with the pressurizing device and the rod side with the hydraulic fluid reservoir or:
  - a second position in which the hydraulic system connects a rod side with the pressurizing device and a head side with the hydraulic fluid reservoir, whereby the valve and the reader enable the detection of two further states of the safety system, wherein these two states are piston in fully extended state and piston in fully retracted state.

vii) The embodiment according to vi), wherein the piston in locked state is detected when the sensed pressure P1 sensed by the first pressure sensor is higher than $P1_{limit}$ and when the reversing valve is in the first position.

viii) The embodiment according to vi), wherein a piston in fully retracted state, can be detected when the sensed pressure P1, sensed by the pressure sensor, is higher than $P1_{limit}$ and when the valve is in the second position.

The invention has now been described using various embodiments. In particular the embodiment shown in FIGS. 7 to 11 can also be combined with a second pressure sensor for example arranged close to the head side. Additionally position of the first pressure sensor 42 and the bypass channel 58 may be switched so that the bypass channel 58 bridges the seal device 52 when the piston 20 is in the fully retracted state. The skilled person understand that such changes fall under the scope of the present invention.

The invention claimed is:

1. A safety system for a machine comprising:
  - a pump;
  - at least one hydraulic cylinder comprising a pressure chamber and a piston, the piston having a head and a rod, and being movable along a longitudinal direction of the at least one hydraulic cylinder, the hydraulic cylinder further comprising a first channel and a second channel extending into the pressure chamber;
  - at least one lock finger connected to the hydraulic cylinder, the at least one lock finger being configured to engage a bracket of a tool, when the hydraulic cylinder and the piston, respectively, is in an extended position, which extended position corresponds to a locked state,
  - a first pressure sensor and a second pressure sensor configured to measure pressure within the pressure chamber via the first channel and the second channel, respectively, the first channel having a first opening and the second channel having a second opening, which first and second openings extend into the pressure chamber, said first opening and said second opening being spaced apart from one another as seen in the longitudinal direction of the at least one hydraulic cylinder;

a seal arranged circumferentially around the head of the piston; and a hydraulic system being fluidically connected to a head side and a rod side of the at least one hydraulic cylinder, the hydraulic system being fluidically connected to a hydraulic fluid reservoir and the pump, wherein the seal is designed to move a plurality of times over the first and second openings and wherein the first pressure sensor senses a pressure P1 and the second pressure sensor senses a pressure P2, and wherein the piston in said locked state is detected when: P1<P2.

2. The safety system according to claim 1, wherein the hydraulic fluid reservoir has a tank pressure $P_{res}$, the tank pressure $P_{res}$ being lower than a pressure generated by the pump, and wherein a piston activated but blocked state is detected when: P1=P2=$P_{res}$, and wherein the blocked state is a state, in which the at least one lock finger is partially extended but blocked by the bracket of the tool, from reaching the locked state.

3. The safety system according to claim 1, wherein the pump provides a system pressure $P_{syst}$, the system pressure $P_{syst}$ being higher than a tank pressure $P_{res}$, and wherein a piston in a fully retracted state and a piston in a fully extended state can be detected when P1=P2=$P_{syst}$.

4. The safety system according to claim 1, wherein the hydraulic system further comprises a reversing valve connected to a reader for determining a position of the reversing valve, the reversing valve being able to be moved between:

a first position in which the hydraulic system connects the head side with the pump and the rod side with the hydraulic fluid reservoir; and a second position in which the hydraulic system connects the rod side with the pump and the head side with the hydraulic fluid reservoir, whereby the reversing valve and the reader enable the differentiation of the piston in a fully extended state and the piston in a fully retracted state.

5. The safety system according to claim 4, wherein the piston in the fully retracted state is detected when: P1=P2 and when the reversing valve is in the second position.

6. The safety system according to claim 4, wherein the piston in the fully extended state is detected when: P1=P2 and when the reversing valve is in the first position.

7. The safety system according to claim 1, wherein the hydraulic system comprises a third pressure sensor for sensing a pressure P3, wherein the third pressure sensor is arranged at the or at least close to the head side, the third pressure sensor being used for the detection of the differentiation of the piston in a fully extended state and the piston in a fully retracted state.

8. The safety system according to claim 7, wherein the piston in the fully retracted state is detected when: P1=P2 and P3<P2, P1.

9. The safety system according to claim 7, wherein the piston in the fully extended state is detected when: P1=P2=P3.

10. The safety system according to claim 7, wherein a piston activated but blocked state can be further verified using the third pressure sensor when P1=P2 and P3>P1,P2.

11. The safety according to claim 7, whereby the pump provides a system pressure $P_{syst}$, the system pressure $P_{syst}$ being higher than a tank pressure $P_{res}$, and wherein P1=P2=P3=$P_{syst}$ when the piston is in the fully extended state.

12. The safety system according to claim 1, wherein the safety system comprises two or more hydraulic cylinders.

13. The safety system according to claim 2, wherein the pump provides a system pressure $P_{syst}$, the system pressure $P_{syst}$ being higher than a tank pressure $P_{res}$, and wherein a piston in a fully retracted state and a piston in a fully extended state can be detected when P1=P2=$P_{syst}$.

14. The safety system according to claim 2, wherein the hydraulic system further comprises a reversing valve connected to a reader for determining a position of the reversing valve, the reversing valve being able to be moved between:

a first position in which the hydraulic system connects the head side with the pump and the rod side with the hydraulic fluid reservoir; and a second position in which the hydraulic system connects the rod side with the pump and the head side with the hydraulic fluid reservoir, whereby the reversing valve and the reader enable the differentiation of the piston in a fully extended state and the piston in a fully retracted state.

15. The safety system according to claim 3, wherein the hydraulic system further comprises a reversing valve connected to a reader for determining a position of the reversing valve, the reversing valve being able to be moved between:

a first position in which the hydraulic system connects the head side with the pump and the rod side with the hydraulic fluid reservoir; and a second position in which the hydraulic system connects the rod side with the pump and the head side with the hydraulic fluid reservoir, whereby the reversing valve and the reader enable the differentiation of the piston in the fully extended state and the piston in the fully retracted state.

* * * * *